May 21, 1957 C. O. KREUTZER 2,792,659
DIRECT CURRENT ELECTRO-FISHING ARRANGEMENT
Filed Nov. 10, 1954 3 Sheets-Sheet 1

INVENTOR.
CONRADIN OTTO KREUTZER
BY Arthur J. Robert
ATTORNEY

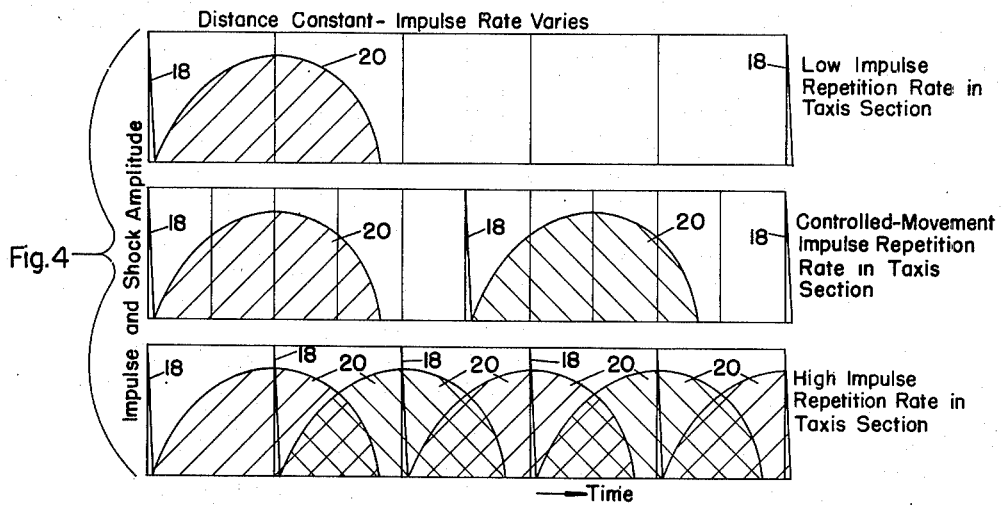
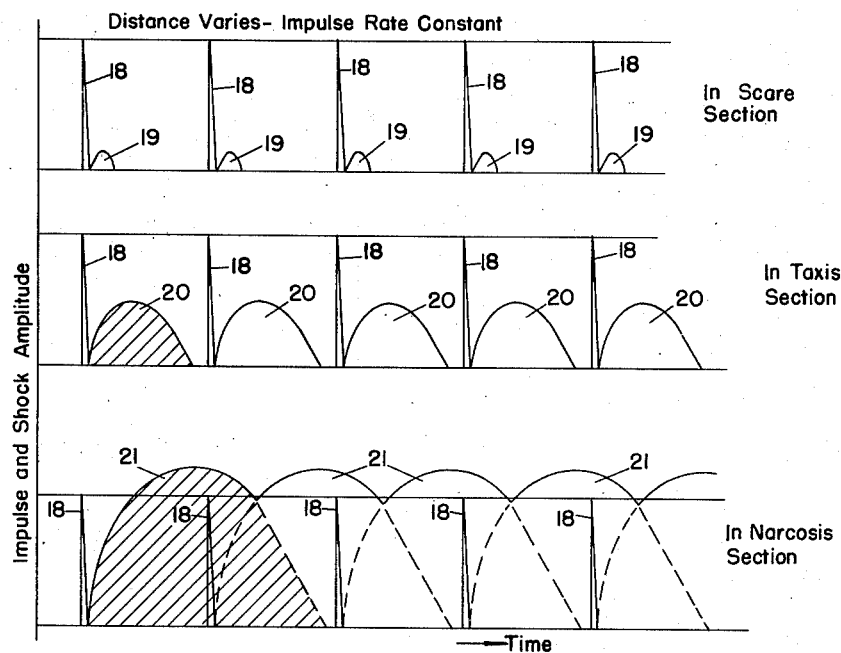

United States Patent Office 2,792,659
Patented May 21, 1957

2,792,659

DIRECT CURRENT ELECTRO-FISHING ARRANGEMENT

Conradin Otto Kreutzer, Hamburg, Germany, assignor to Fish Products Company, Lewes, Del., a corporation of Delaware Application November 10, 1954, Serial No. 468,093

2 Claims. (Cl. 43—17.1)

In continuous or sustained direct current electro-fishing arrangements, a spherical unvarying electric field is set up and electrically centered around the anode. For a fish of given specie and length, this field appears to have three sections, namely:

(a) an outer scare section in which the fish is scared further away from the anode possibly because the potential difference, imposed across its length by the voltage gradient of the electric field, is below the minimum body orienting potential of that fish;

(b) an electro-taxis section in which the fish is forced to swim toward the anode as it does when its potential difference is between its minimum and maximum body orienting potentials; and (c) an electro-narcosis section in which it is immobilized as it is when its potential difference is above its maximum body orienting potential.

While the foregoing sustained direct current arrangement has the advantage of creating an electro-taxis section, it has a number of serious limitations. In the first place, its use is limited to fresh water because of its prohibitive power requirements for effective use in salt water. Also the fish, which it immobilizes, may be scattered over the depth and breadth of the relatively large narcosis area and therefore correspondingly difficult to collect. Furthermore the shell-like taxis area, which grows in importance with size, is relatively thin.

The present invention enables some of the foregoing limitations to be substantially reduced and others eliminated. Among its more important objects are: to provide a direct current fishing arrangement which is suited for use in salt water as well as in fresh water and which makes electro-fishing in salt water commercially feasible; to control the movement of certain fish within the taxis section in a very effective manner wherein they are subjected to repeated reorienting shocks compelling them to swim toward the attractive electrode and preventing their escape outwardly from the taxis section; to widen the taxis section while narrowing the narcosis section preferably to such substantial degrees that the narcosis and taxis sections respectively become relatively small and large; and to enable the narcosis section to be reduced in size to such a degree that it becomes practical to enclose either all or most all of the narcosis section within the attractive electrode and thus produce an electro-fishing arrangement wherein certain fish within the taxis section are compelled to move to a relatively small concentration area along the inner portion of the taxis section where they may be readily collected.

So far as is known, a satisfactory direct current electro-fishing arrangement for salt water use has not heretofore been developed although it is known that the prohibitive power consumption, of sustained direct current arrangements, can be overcome through the use of intermittent or impulse direct current. Possibly the reason for this failure to develop is found in the electrical fish barrier or fence art which teaches that direct current at low impulse rates will scare fish from the electrified area while higher rates stun them.

My invention is based on the discovery that between the low impulse rate, which allows the fish to escape in a direction of its choice, and the higher impulse rate, which stuns the fish, there is an intermediate impulse rate in which the fish are forced to swim toward the anode without any chance of effecting an escape or being stunned. In other words, there are three rate ranges, nemely, low, intermediate and high, for a given specie and length of fish and these ranges change with changes in either specie or length. In general, the bottom and top limits of the intermediate or controlled-movement repetition rate range move upward and become more widely spaced as the fish become smaller.

Apparently the best results are obtained from a short impulse having a condenser-like discharge characteristic with high-peak voltage and current. I have found that when a direct current impulse of this type is discharged through the fishing water at a rate within the controlled-movement rate range of certain fish, a small or thin narcosis section and a relatively large or thicker taxis section will be established and that such of said certain fish, as are located within the taxis section when the current is turned on, will be compelled to swim toward and be concentrated at the relatively small narcosis section where they can be collected with ease.

The invention is illustrated in the accompanying drawing wherein:

Figures 1 and 2 disclose direct current impulses of types most useful in practicing the present invention;

Figure 4 shows how the relationship of impulse and shock effect changes, at a given point in the taxis section, when the repetition rate is changed from a value in one range to a different value in each of the other two ranges;

Figure 5 shows how the relationship of impulse and shock effect changes at a given repetition rate when the distance from the attractive electrode is changed;

Figure 1:
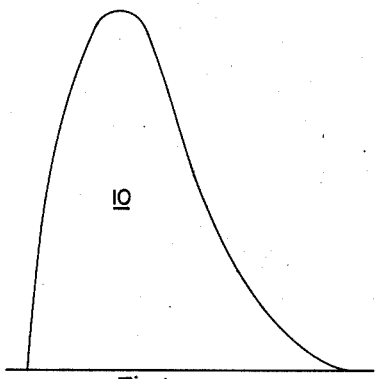
Figure 2:
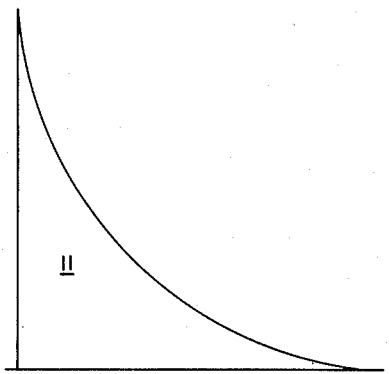

In Figures 1 and 2, direct current impulses 10 and 11 are shown. Each has a triangular shape characterized by steep vertical sides of relatively different slope and by high peak-voltage and amperage. Both of these impulses represent condenser-like discharges, the first having appreciable inductance and the second, relatively little inductance, which is preferred.

In the impulses of Figs. 1 and 2, the current increases at a rate faster than the rate at which it decreases. Where this is so, the body orienting potential induced in the fish will cause them to swim toward the anode. But, if the rate of decrease is greater than the rate of increase, then the body orienting potential will cause the fish to swim toward the cathode. My invention embraces both types of impulses but I prefer impulses of the type illustrated in Figs. 1 and 2 since the apparatus for generating them is usually more readily designed.

Figure 3:
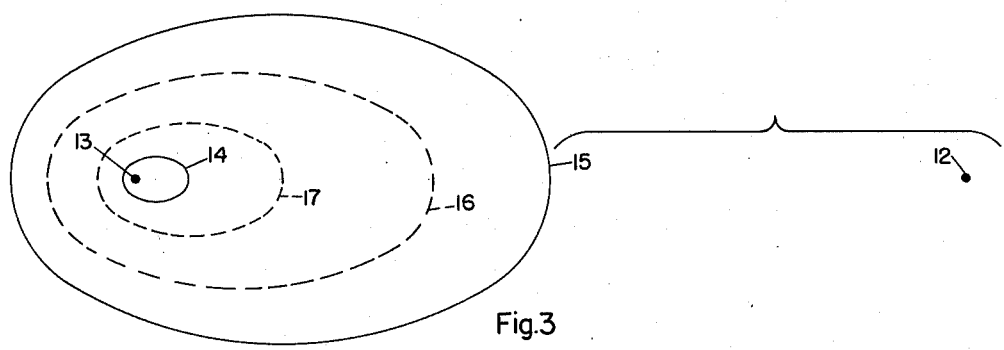
Figure 3 illustrates the cross sectional shape of an effective electro-fishing area as set up in accordance with this invention.

The shape of the narcosis, taxis and scare sections depends on the spacing of the electrodes 12 and 13. Where the anode 13 is located at a very great distance from the cathode 12, these sections will all be in the form of true spheres electrically and geographically centered about the anode. When the electrodes are brought closer together, as they will be in shipborne and other commercial electro-fishing arrangements, these shapes will be pulled toward the cathode 12 into distorted spherical shapes of teardrop cross section or of oval cross section as shown in Figure 3.

The size of the taxis section depends, in part, upon the size of the fish. Figure 3 illustrates, in solid lines, the inner and outer limits 14 and 15 of an oval shaped taxis section for a fish of a given large size. With fish of smaller size, the taxis section is smaller; hence, if all other conditions remain the same, the dotted lines 16 and 17 in Figure 3 may be used to indicate the outer limits of the taxis section for fish of two successively smaller sizes.

The size of the taxis section also varies with the specie of fish. Thus one specie of fish may have maximum and minimum body orienting potentials of 2.0 volts and 0.7 volt respectively. Another specie of fish may have corresponding potentials of 2.0 and 1.0 volts. If both species are of the same length, then both will have the inner limit of its taxis section at the same location but their outer limits will differ making the taxis section of one specie larger than the other. Normally these values of body orienting potential do no change much, if at all, in a given specie with changes in size.

The size of the taxis section also depends on the peak values of the impulse. Thus the location of the inner and outer limits for a given fish depend upon the voltage gradient or current density pattern created by the impulse at its peak. The inner limit is established by points where the peak voltage gradient will impose, across the length of the fish, a potential difference equal to the maximum body-orienting potential of the fish. This is but another way of saying that the inner limit is established by a succession of points of uniform current density where the peak-value at each point is of the magnitude required to produce, across the length of a fish of given specie, the largest voltage drop which will reorient the fish without immobilizing it. Similarly the outer limit is made up of points of uniform current density where each point is of the magnitude required to produce across the length of that fish, its minimum body orienting potential or the smallest voltage drop which will reorient the fish rather than simply scare it.

To illustrate how the peak-value of an impulse may change the size of the taxis area, we first assume an impulse generating system, using a 600 volt, 200 amp. D. C. generator as a source of power and generating impulses having a peak-voltage of 1700 volts, a peak current of 13,000 amps. and a length of 2 milliseconds, then the spherical taxis section of Figure 3 for large fish might have, for example, outside and inside radii of 18 and 3 feet respectively at its point of maximum thickness between electrodes. With an impulse generating system, using a 2,000 volt and 100 amp. D. C. generator and generating impulses having a peak-voltage of 4,000 to 5,000 volts and a peak-amperage of 40,000 to 50,000 amps., the maximum thickness of the taxis area may be as much as 40 or 50 feet particularly if the impulse discharge circuit resistance is kept low, at say less than 1/10 of an ohm.

In accordance with my invention, a given impulse is repeated at a rate within the controlled-movement rate range between the low scare and the high stunning rate ranges. The difference between these three rate ranges may be explained in connection with Figure 4 which illustrates the relationship, in each of these rates and between all of them, of impulse, physiological effect and time. The significance of Figure 4 may be more readily apparent by considering each impulse as being 2 milliseconds long, and by assuming that the rates of 1, 2 and 5 impulses, per 200 milliseconds, are respectively within the low, the controlled-movement and the high repetition rate ranges of a fish of given size and specie and that such fish is located along the outer limit 15 of the taxis section.

With the foregoing in mind, and with a low repetition rate of one impulse every 200 milliseconds, the first impulse 18 will impose, across the length of the fish at the outer limit of the taxis section, a potential difference equal to the minimum body orienting potential of the fish and thus cause it to experience a shock sensation 20 of unknown magnitude and duration. This is effective to cause that specie of fish to jerk its head in a convulsive movement toward the anode. However, before that impulse 18 is repeated, the fish will have time to recover completely from that shock and swim away in the direction of its choice.

With a controlled-movement repetition rate of 2 impulses every 200 milliseconds, the same fish in the same location of the taxis section will be shocked by an identical impulse 18 and will experience an identical sensation 20 which forces it to make the same convulsive movement toward the anode. As before, it will entirely recover from that shock. This time, however, the impulse is repeated before the fish can swim away and, as a result of this repetition, it experiences a slightly higher shock sensation which forces it to make another involuntary movement bringing it closer to the anode.

With a high repetition rate of 5 impulses every 200 milliseconds, the same fish in the same location of the taxis section will again be shocked by an identical impulse 18. In this case, however, the fish can not complete the execution of a separate movement after each single impulse because it is subjected to a succeeding impulse before it can recover from the shock 20 of a preceding impulse. As a consequence of these repeated shocks without an opportunity to recover, the fish falls into a state of narcosis in which it is practically if not completely immobilized.

Figure 5 will now make self-evident that an impulse repetition rate within the controlled-movement range is effective to compel movement of the fish only in the taxis section. In the scare and narcosis sections, it subjects the fish to scaring and stunning shock sensations 19 and 21 respectively. It seems to be that the use of impulse current at the controlled-movement rate effects a substantial increase in the size of the taxis section and a substantial decrease in the size of the narcosis section. It may be that the scare, intermediatae and stun rate changes correspond respectively to the scare, taxis and narcosis sections, and that each rate range magnifies the extent of its corresponding section while diminishing the extent of the other sections.

Figure 6:
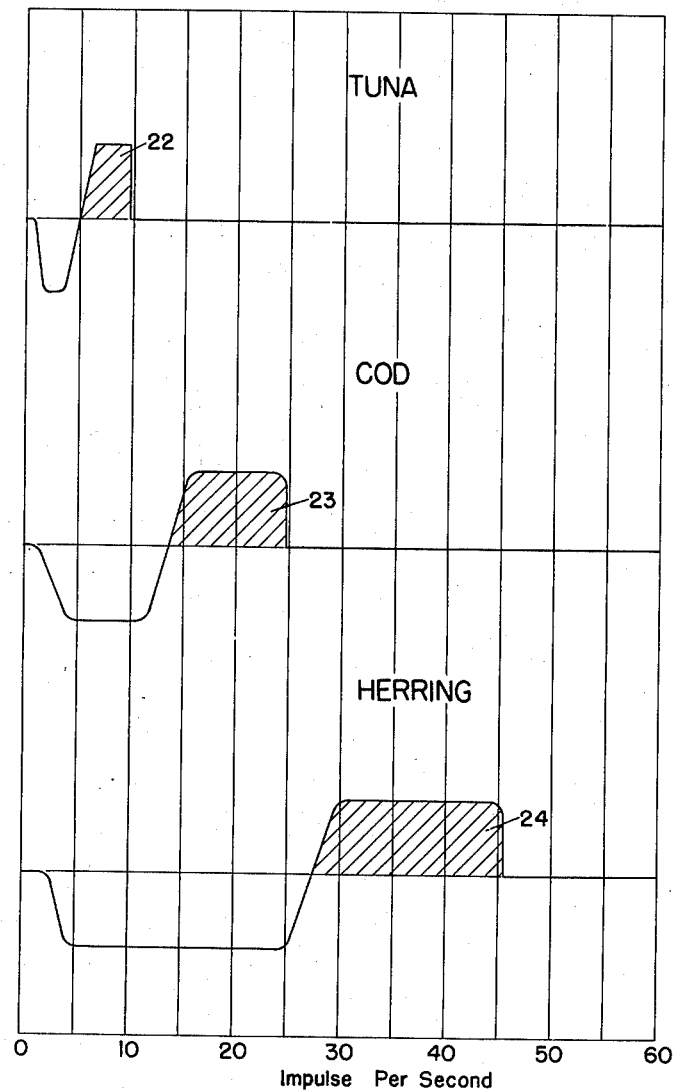
Figure 6 shows three different specific repetition rate ranges for each of three different species of fish.

Figure 6 shows different impulse rate ranges for different species of fish. Here it will be observed that large fish, like tuna, have an intermediate impulse repetition rate range 22 extending from approximately 5 impulses per second to 10 impulses per second. The low rate range for tuna is below 5 and the high above 10. Fish of intermediate size such as cod have an intermediate repetition rate range 23 of 14 to 24 impulses per second while smaller fish such as herring have an intermediate rate range 24 of 27 to 46 impulses per second.

Figure 7:
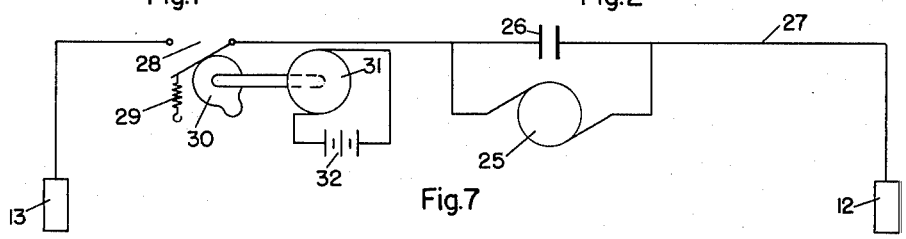
Figure 7 is a schematic view of an extremely simple form of impulse generator.

Any suitable impulse generator can be used such as the arrangement shown in Figure 7. Here a direct current generator 25 charges a condenser 26 which is connected through line 27 to electrode 12 and line switch 28 to electrode 13. Line switch 28 is biased toward the open position by a spring 29 and repeatedly closed at a desired rate by cam 30. Cam 30 is driven by motor 31 which is connected to power supply 32.

It will be understood that the motor 31 is adjustable to any speed within a range capable of giving an impulse repetition rate ranging from 1 or 2 impulses per second up to 100 impulses per second more or less and that these impulses will be of the desired voltage, current, contour and time characteristics desired. Since the peak current values are high, it may be desirable to replace the circuit interrupting switch 28 and its associated parts with the thyratron arrangement shown in my co-pending joint application Serial No. 104,494 filed July 13, 1949 now abandoned, or with the thyratron-ignition arrangements shown in my aforesaid co-pending joint application and in U. S. Patent No. 2,426,037, issued August 19, 1947, to Mahoney, et al.

Figure 8:
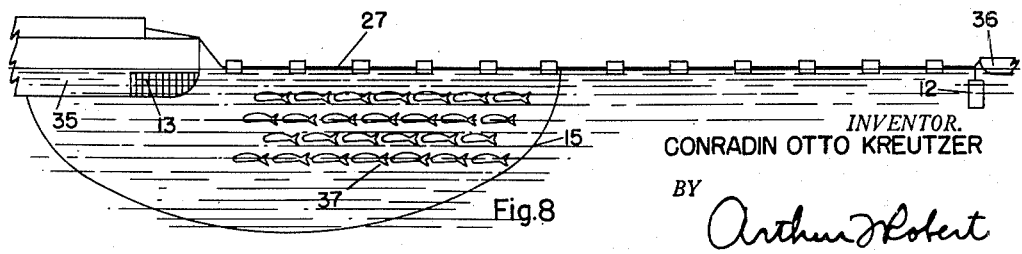
Figure 8 is a schematic view of an electro-fishing operation under my invention.

In carrying out my invention, a large boat 35 (see Fig. 8) may be equipped with an impulse generator having a floating lead line 27 connected to an electrode 12 and also having an anode electrode 13 which may be attached to the hull of the boat 35. The lead line 27 and electrode 12 are normally carried by the boat 35 but a smaller boat 36 is provided to tow the electrode 12 whenever desired.

At sea, when a school of fish 37 is sighted, its specie and size is then determined. With this information, the size of the taxis area for such fish and for the impulse generating equipment on boat 35 will either be instantly known or readily ascertainable. The boats 35 and 36 are now maneuvered to place the school of fish not only between the boats but within their taxis area, the outer limits of which are designated in Fig. 8 by the solid line 15. In the meantime the electrical apparatus is adjusted so that when energized it will send out its impulses at a rate within the controlled-movement repetition rate range for the fish in question.

When all of this has been accomplished, the electrical circuit is energized causing the fish within the taxis area to swim toward boat 35 and congregate around electrode 13. If this electrode is smaller than the narcosis section, the fish coming within the narcosis section will be stunned. On the other hand, if the electrode 13 is equal to or greater than the narcosis section, none of the fish should be stunned. When the fish are thus congregated, they may be collected in any suitable manner, as, for example, by pumping, dip netting, purse seining.

From the foregoing it will be appreciated that, in the practice of my invention, a triangular direct current impulse, characterized by steep vertical sides of relatively different slope, is generated. This impulse is also characterized by peak voltage and amperage values capable of creating, in the fishing waters surrounding the attractive submerged electrode, certain peak electrical conditions. These conditions are sufficient to produce, in fish of a given size or specie located over a substantial range of distances from the attractive electrode, the body orienting physiological effects which characterize a taxis section for such fish. When this impulse is discharged through the fishing waters between electrodes, including the attractive electrode, it will establish, momentarily, an effective electrified area extending around the attractive electrode and containing the aforesaid taxis section. Now by repeating the discharge of like impulses at a rate, which is within the controlled-movement repetition rate range for said fish, any fish of said given size or specie, which is within said taxis section, will be compelled to move through the fishing water in the direction of said attractive electrode.

Having described my invention, I claim:

1. In the art of electro-fishing, a method of constraining fish of a given size or specie to swim toward an attractive submerged electrode comprising: generating a triangular direct current impulse characterized by steep vertical sides of relatively different slope and by peak voltage and amperage values capable of creating, in the fishing waters surrounding an attractive submerged electrode, peak electrical conditions sufficient to produce, in said fish over a substantial range of distances from said electrode, the body orienting physiological effects which characterize a taxis section for said fish; discharging said impulse through the fishing waters between electrodes, including said attractive electrode, to establish momentarily an effective electrified area extending around said attractive electrode and containing said taxis section; and repeating the discharge of like impulses at a predetermined rate within the controlled-movement repetition rate range for said fish, and between the low scare and high stunning rate ranges thereof, to compel fish of said given size or specie, which are within said taxis section, to move through the fishing water in the direction of said attractive electrode.

2. An electro-fishing method comprising: locating a school of fish in the fishing water; providing a shipborne apparatus operable, when energized, to practice the method of claim 1 on fish of said school; maneuvering said electrode means to position the potential taxis section so that it embraces the space occupied by fish of said school; and energizing said apparatus to create said taxis section when said fish are so embraced.

References Cited in the file of this patent
UNITED STATES PATENTS

| | | |
|---|---|---|
| 2,233,045 | Bonner et al. | Feb. 25, 1941 |
| 2,238,897 | Gomez | Apr. 22, 1941 |
| 2,605,742 | Burkey | Aug. 5, 1952 |
| 2,745,205 | Kafka | May 15, 1956 |

FOREIGN PATENTS

| | | |
|---|---|---|
| 176,096 | Great Britain | Feb. 27, 1922 |
| 693,229 | Great Britain | June 24, 1953 |
| 699,346 | Great Britain | Nov. 4, 1953 |

OTHER REFERENCES

McLain and Nielsen: "Directing the Movement of Fish with Electricity." Special Scientific Report; Fisheries No. 93. Published January 1953 by U. S. Dept. of the Interior.